Patented May 28, 1935

2,003,051

UNITED STATES PATENT OFFICE 2,003,051

PURIFICATION OF STRONG PHOSPHORIC ACID

William H. Knox, Jr., Nashville, Tenn., assignor to Victor Chemical Works, a corporation of Illinois No Drawing. Application July 5, 1933,
Serial No. 679,145

5 Claims. (Cl. 23—165)

This invention relates to the purification of strong phosphoric acid and more particularly to the removal of lead therefrom.

In the procedure heretofore followed for the purification of commercial phosphoric acid, it has been the practice to treat the acid with hydrogen sulphide to remove arsenic and copper impurities and to treat with small percentages of sulphuric acid to precipitate the lead impurities. By this procedure, the lead content is reduced to 2.5 to 5 parts per million by weight.

It has now been discovered that by supplying chlorine ion concentration to a strong phosphoric acid to a point where the chlorine ion concentration is of the order of at least 600 parts per million in excess of the quantity required for the precipitation of the lead, the lead concentration can be reduced to less than two parts per million by weight. For example, with a concentration of 840 parts per million of chlorine ions, in an acid which contained 16 parts of lead per million, the lead was reduced to 1.1 parts per million. It is realized, of course, that normal commercial phosphoric acid contains chlorine ions ranging from 30–60 parts per million by weight, but such concentrations of chlorine have no apparent effect upon the concentration of the lead.

In carrying out the purification of phosphoric acid with chloride ions, it is desirable to use the higher concentrations of phosphoric acid. For example, an acid containing 30 parts of lead per million, when treated with 840 parts of chlorine ions per million at 30° C., reduced the lead to 1 part per million with 85% phosphoric acid, to 2 parts per million with 77% phosphoric acid, and to 5.3 parts per million with 70% acid.

The purification is also sensitive to temperature and the lower the temperature of treatment, the better is the purification. For example, the lead content of 77% phosphoric acid containing 16 parts of lead per million was reduced to 3.6 parts per million at 35° C., whereas at 30° C. the lead was reduced to 1.1 parts per million by weight.

As an example of the process, a 75% phosphoric acid was treated with sulphuric acid equivalent to 0.5% or less $SO_3$ on the treated acid. The precipitated lead sulphate may be immediately filtered, or not, as desired. Hydrogen sulphide gas was then passed into the acid until the arsenic and copper had been precipitated. A chloride ion supplying compound, such as sodium chloride, is then added to supply chloride ions sufficient to insure a concentration of the order of 600 parts per million after the desired precipitation of lead has been attained. The precipitated lead compound and other precipitated impurities may then be removed from the acid by filtration. This treatment should be carried out at a temperature of 35° C. or lower. Any excess chloride ions may be removed as hydrochloric acid gas by bubbling air through the mixture.

While it is not necessary to treat the phosphoric acid preliminarily with sulphuric acid, in order to remove the bulk of lead as lead sulphate, it is preferred to do so.

The foregoing detailed description has been given for clearness of understanding only, and no unnecessary limitations should be understood therefrom, but the appended claims should be construed as broadly as permissible, in view of the prior art.

What I claim as new and desire to secure by Letters Patent is:

1. The method of substantially completely removing lead impurities from strong phosphoric acid which comprises adding to phosphoric acid having a concentration of the order of 70% or higher and containing lead impurities, a compound yielding chloride ions in an amount substantially in excess of the number required to form lead chloride with the lead present, whereby substantially all of the lead is precipitated as a lead chloride compound, and separating the resulting lead chloride compound from the acid.

2. The method as set forth in claim 1 in which the excess chloride is at least 600 parts per million.

3. The method as set forth in claim 1 in which the gross lead impurities are preliminarily removed with sulfuric acid.

4. The method as set forth in claim 1 in which the excess chloride is removed by blowing air through the acid.

5. The method as set forth in claim 1 in which the precipitation of the lead chloride compound is carried out below 35° C.

WILLIAM H. KNOX, Jr.